United States Patent
Suzuki

(10) Patent No.: US 7,425,777 B2
(45) Date of Patent: Sep. 16, 2008

(54) LIGHTING CIRCUIT

(75) Inventor: Tomokazu Suzuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 58 days.

(21) Appl. No.: 11/654,678

(22) Filed: Jan. 18, 2007

(65) Prior Publication Data
US 2007/0164689 A1  Jul. 19, 2007

(30) Foreign Application Priority Data
Jan. 18, 2006  (JP) .............................. 2006-010360

(51) Int. Cl.
*B60L 1/14* (2006.01)

(52) U.S. Cl. .................. 307/10.8; 315/291; 315/DIG. 7

(58) Field of Classification Search .................. 315/77, 315/82, 209 R, 224–226, 291, 307–308, DIG. 7; 307/10.1, 10.8
See application file for complete search history.

(56) References Cited

U.S. PATENT DOCUMENTS

| | | | | |
|---|---|---|---|---|
| 5,212,428 A | * | 5/1993 | Sasaki et al. ................. | 315/308 |
| 5,705,898 A | * | 1/1998 | Yamashita et al. .......... | 315/308 |
| 5,920,128 A | * | 7/1999 | Hines .......................... | 307/10.8 |
| 6,137,240 A | * | 10/2000 | Bogdan ...................... | 315/307 |
| 6,426,570 B1 | * | 7/2002 | Nerone ...................... | 307/10.8 |
| 6,563,275 B2 | * | 5/2003 | Ito et al. ...................... | 315/308 |
| 2004/0119425 A1 | * | 6/2004 | Okamoto et al. ............ | 315/291 |
| 2006/0006812 A1 | * | 1/2006 | Alexandrov ................ | 315/224 |
| 2006/0108940 A1 | * | 5/2006 | Kamoi ................... | 315/209 R |
| 2006/0175983 A1 | * | 8/2006 | Crouse et al. ............... | 315/291 |

FOREIGN PATENT DOCUMENTS

| JP | 2003-338390 A | 11/2003 |
|---|---|---|
| JP | 2005-026071 A | 1/2005 |

* cited by examiner

*Primary Examiner*—Thuy Vinh Tran
*Assistant Examiner*—Tung X Le
(74) *Attorney, Agent, or Firm*—Sughrue Mion, PLLC

(57) ABSTRACT

A lighting circuit includes a DC/DC converting circuit for boosting an input DC voltage so as to produce boosted DC power, a detecting circuit for producing a detection signal in response to the output voltage of the DC/DC converting circuit, a DC/AC converting circuit for producing AC power to be supplied to the discharge tube from the boosted DC power, a starting circuit for starting up the discharge tube, and a control circuit for receiving the detection signal from the detecting circuit. The control circuit contains a capacitor which is charged based upon the detection signal, a first discharging unit for discharging the capacitor, a second discharging unit for providing a discharging path for the capacitor in response to turning-OFF of the input DC voltage, and a signal producing unit for producing a control signal used to adjust the output of the DC/DC converting circuit in response to a terminal voltage of the capacitor.

5 Claims, 12 Drawing Sheets

LIGHTING CIRCUIT

This application claims priority to Japanese Patent Application No. 2006-010360, filed Jan. 18, 2006, in the Japanese Patent Office. The priority application is incorporated by reference in its entirety.

TECHNICAL FIELD

The present disclosure is related to a lighting circuit for lighting a discharge tube used in a vehicle.

RELATED ART

In the case where discharge tubes are employed for illumination of vehicles, since luminous flux thereof must be quickly raised after lighting of the discharge tubes has been started, transient power control operations are carried out as follows. That is, just after the discharge tubes are lighted, electric power higher than electric power supplied when the discharge tubes are lighted under a stationary condition is supplied to the discharge tubes, and the supplied electric power is reduced in accordance with time elapses. As to the discharge tubes, two different types of discharge tubes are known in the technical field. In one type of discharge tube, a very small amount of mercury is sealed, and in another type of discharge tube, a mercury-free discharge tube does not seal any mercury in considering environmental concerns. In the latter case, a transient power control operation must be carried out by considering fluctuations of lamp voltages in an initial stage when the mercury-free discharge tube is lighted, and also fluctuations of rising characteristics of luminous flux. For instance, the following control arrangement is known (refer to patent publication 1: Japanese Patent Unexamined Publication No. 2003-338390), in which a lamp voltage (or signal voltage equivalent to this lamp voltage) just after a discharge tube is lighted is detected. This detected lamp voltage is stored as an initial value, and also, a change amount (voltage difference) of lamp voltages is calculated while the initial value is used as a reference. Electric power supplied to the discharge tube is controlled based upon the calculated change amount.

In discharge tubes into which mercury is sealed, change amounts of lamp voltages are large and correlation characteristics between the lamp voltages and optical outputs are high within a time period after lighting of the discharge tubes is started until the discharge tubes are lighted under stationary condition. Therefore, a method for detecting lamp voltages so as to control electric power supplied thereto based upon the detected lamp voltages is employed. To the contrary, in discharge tubes into which mercury is not sealed, change amounts of lamp voltages are small within a time period after lighting of the discharge tubes is started until the discharge tubes are lighted under stationary condition. Therefore, correlation characteristics between the lamp voltages and the optical outputs can be hardly grasped, and thus such a control method is required which is different from the transient power control method related to the discharge tubes containing mercury. For instance, in the case of such a discharge tube having a rated electric power of 35 W, the below-mentioned control method is employed:

(1) When lighting of the discharge tube is started, constant electric power of 75 W is supplied thereto.

(2) When the value of the change amount "ΔVL" reaches a certain threshold value (will be expressed as "ΔVL1"), the constant electric power is reduced to such an electric power in response to the change amount "ΔVL." Herein, a charge amount of a lamp voltage is expressed as "ΔVL" while a lamp voltage (initial value) just after the lighting operation is employed as a reference.

(3) In the case where the value of the change amount ΔVL is further increased and then reaches a certain threshold value (will be expressed as "ΔVL2"), a timer control operation is started, and the supplied electric power is reduced in connection with a time elapse so as to be converged to 35 W. It should be noted that as to the timer control operation, such an arrangement is known that while an integration circuit using a capacitor and a resistor is employed, the supplied electric power is reduced in response to a voltage increase of the capacitor.

FIG. 13 is a graphic diagram for graphically exemplifying temporal changes as to electric power "Pw" supplied to a discharge tube, a lamp voltage "VL", and a terminal voltage "Vc" of a timer controlling capacitor in such a case where lighting of the discharge tube is started from a cold condition (so-called "cold start"). It should be understood that a time instant "t1" and another time instant "t2" shown in this drawing are defined as follows:

t1=time instant when ΔVL is reached to ΔVL1
t2=time instant when ΔVL is reached to ΔVL2

In this example, it is assumed that an initial value of the lamp voltage is 25 V, and within a time period during which the change amount ΔVL is increased while time is incremented towards the time instant t1, electric power applied the discharge tube is 75 W. Then, after the elapse time reaches the time instant t1, the electric power supplied to the discharge tube is reduced in accordance with the ΔVL value, and then, when the time reaches the time instant "t2", the timer control operation is started. In other words, the charging operation of the timer controlling capacitor is started, and then the terminal voltage Vc is gradually increased. The electric power supplied to the discharge tube is reduced in an opposite relationship to the ascent curve of the terminal voltage Vc, and then is finally converged to 35 W (in this example, a saturated value of lamp voltage is assumed to be 45 V).

The time instants "t3" and "t4", and a time period "Tn" shown in FIG. 13 are defined as follows:

t3=starting point when noise is generated
t4=end point when noise is generated
Tn=noise generating time period (t3 to t4)

Within the noise generating time period Tn (for instance, 10 seconds to 20 seconds after lighting is started) started from the time instant "t3", the status of the discharge tube becomes unstable, and thus there are some possibilities that electromagnetic noise may be radiated during this noise generating time period.

In a discharge tube containing mercury, as one of the effects from mercury, a temperature increase of a luminous tube is emphasized in order that the discharge tube can emit light even under such a condition that the luminous tube is in a cold condition. However, since a discharge tube containing no mercury cannot utilize the effects caused by mercury, the temperature of the luminous tube must be increased by increasing transient electric power supplied to the discharge tube. As a consequence, in the discharge tube containing no mercury, this discharge tube is designed in order to be capable of enduring excessively high supplied electric power by making electrodes of the luminous tube wider. As a consequence, in the transient power control operation of the discharge tube containing no mercury, lengthy time is necessarily required after lighting of the discharge tube is started until the discharge thereof becomes stable. When electromagnetic noise generated during this long time period is radio noise, there are some risks that adverse influences may be given to various types of electronic appliances such as radio receivers and television receivers.

As a result of experiments, as a method of capable of suppressing the generation of the electromagnetic noise during the noise generating time period "Tn", the below-mentioned fact could be revealed. That is, larger amounts of electric power may be supplied to the discharge tube during the noise generating time period. When a so-called "cold start" is carried out, such a technical idea is conceivable that while an overshoot in a rising characteristic of an optical output is suppressed, electric power supplied to a discharge tube is increased at such a degree that the noise suppression can be performed. However, when a discharge tube is re-lighted (for example, when hot restart is carried out), namely, when lighting of the discharge tube is started from such a condition that the discharge tube is still warm, it is practically difficult to realize at the same time two operation of reducing noise and improving a rising characteristic of an optical output.

SUMMARY

Embodiments of the present invention provide a lighting circuit capable of suppressing radiation noise even in such a case where a discharge tube is re-lighted, while a rising characteristic of an optical output from the discharge tube is not deteriorated.

The lighting circuit of one or more embodiments of the present invention is such a lighting circuit used so as to light a discharge tube for a vehicle. This lighting circuit comprises: (a) a DC/DC converting circuit for boosting an input DC voltage so as to produce boosted DC power; (b) a detecting circuit coupled to the DC/DC converting circuit, for producing a detection signal in response to the output voltage of the DC/DC converting circuit; (c) a DC/AC converting circuit for producing AC power to be supplied to the discharge tube from the boosted DC power; (d) a starting circuit coupled to the DC/AC converting circuit, for starting up the discharge tube; and (e) a control circuit coupled to the DC/DC converting circuit, for receiving the detection signal from the detecting circuit. The control circuit contains: (f) a difference signal producing unit for producing a difference signal indicative of a difference between the detection signal and an initial value of the detection signal; (g) a charging unit for receiving the difference signal and for supplying an electric charge when the difference is higher than, or equal to a predetermined threshold value; (h) a capacitance element coupled to an output of the charging unit via a resistive circuit; (i) a first discharging unit which is coupled to the output of the charging unit and to the capacitance element via the resistive circuit; (j) a second discharging unit coupled to the capacitance element, for providing a discharging path for the capacitance element in response to turning-OFF of the input DC voltage; and (k) a signal producing unit for producing a control signal used to adjust the output of the DC/DC converting circuit in response to a terminal voltage of the capacitance element.

In accordance with the lighting circuit, in response to a control signal responding to the terminal voltage of the capacitance element, the output of the DC/DC converting circuit, namely the output power of the lighting circuit, is controlled. While the second discharging unit is coupled to the capacitance element, the second discharging unit provides such a discharging path for the capacitance element in response to turning-OFF of the input DC voltage. As a consequence, in accordance with this lighting circuit, when the input DC voltage is turned ON, the charging operation to the capacitance element is not disturbed, whereas when the input DC voltage is turned OFF, the electric charge in the capacitance element can be quickly discharged by the second discharging unit. As a result, the terminal voltage of the capacitance element can be reduced until the re-lighting operation of the discharge tube is started. When the discharge tube is re-lighted, high electric power can be provided to the discharge tube. As a consequence, in accordance with this lighting circuit, even when the discharge tube is re-lighted, the radiation noise can be suppressed while the overshoot in the rising characteristic of the optical output from the discharge tube is adjusted.

The second discharging unit is preferably provided with: (a) a diode having an anode coupled to the capacitance element; (b) a first resistor element coupled between a cathode of the diode and a first power supply line; and (c) a second resistor element coupled between the cathode of the diode and a second power supply line.

In this arrangement, when the input DC voltage is turned ON, the voltage between the first power supply line and the second power supply line can be set in such a manner that a voltage at the cathode of the diode which is determined by dividing the voltage by the first resistor element and the second resistor element becomes higher than a voltage at the anode of the diode, namely, the terminal voltage of the capacitance element, whereas when the input DC voltage is turned OFF, both the first and second power supply lines can be grounded. As a result, the second discharging unit can provide two discharging paths for the capacitance element only when the input DC voltage is turned OFF. These two discharging paths correspond to a discharging path constructed by the diode and the first resistive element, and another discharging path constructed by the diode and the second resistive element.

Also, the second discharging unit may be alternatively equipped with: (a) a diode having an anode coupled to the capacitance element; and (b) a resistor element coupled between a cathode of the diode and a power supply line. In this arrangement, when the input DC voltage is turned ON, the voltage of the power supply line can be set in such a manner that a voltage at the cathode of the diode which is determined by being divided by the first resistor element and the second resistor element becomes higher than a voltage at the anode of the diode, namely the terminal voltage of the capacitance element, whereas when the input DC voltage is turned OFF, the power supply line can be grounded. As a result, the second discharging unit can provide a discharging path for the capacitance element only when the input DC voltage is turned OFF. This discharging path corresponds to a discharging path constructed by the diode and the resistive element.

Also, the second discharging unit may be preferably provided with: (a) a diode having an anode coupled to the capacitance element and a cathode coupled to a first power supply line; and (b) a resistor element coupled between the cathode of the diode and a second power supply line. In this arrangement, when the input DC voltage is turned ON, the second power line can be grounded and also the voltage between the first power supply line and the second power supply line can be set in such a manner that a voltage at the cathode of the diode becomes higher than a voltage at the anode of the diode, namely the terminal voltage of the capacitance element, whereas when the input DC voltage is turned OFF, the second power supply lines can be grounded, and the connection between the cathode of the diode and the first power supply line can be separated. As a result, the second discharging unit can provide a discharging path for the capacitance element only when the input DC voltage is turned OFF. This discharging path corresponds to a discharging path constructed by the diode and the resistive element.

Also, the second discharging unit may be equipped with: (a) a diode having an anode coupled to the capacitance element; (b) an interrupting circuit coupled between a cathode of the diode and a first power supply line; and (c) a resistor element coupled between the cathode of the diode and the interrupting circuit, and a second power supply line. When the input DC voltage is turned OFF, the interrupting circuit interrupts the connection between the first power supply line and the cathode of the diode. One example of this interrupting circuit corresponds to an emitter follower which includes a transistor having an emitter coupled to the cathode of the diode and a collector coupled to the first power supply line; and an amplifier which has an output terminal coupled to a base of the transistor, a first input terminal to which a reference voltage is inputted, and a second input terminal coupled to the emitter of the transistor. In accordance with this arrangement, while the emitter follower (interrupting circuit) has been arranged by the transistor and the amplifier, when the input DC voltage is turned ON, both the voltage of the first power supply line and the reference voltage can be set in such a manner that the voltage at the cathode of the diode becomes higher than the anode of the diode, namely the terminal voltage of the capacitance element. In accordance with this structure, when the input DC voltage is turned OFF, no current may flow from the capacitance element via the emitter follower to the first power line and the reference voltage. The second discharging unit can provide a discharging path for the capacitance element only when the input DC voltage is turned OFF without changing the first power supply line and the reference voltage. This discharging path is such a discharging path which is arranged by the diode and the resistor element.

Various implementations may include one or more of the following advantages. For example, it is possible to provide a lighting circuit capable of suppressing radiation noise even in such a case where the discharge tube is re-lighted, while the rising characteristic of the optical output from the discharge tube is not deteriorated.

Other features and advantages may be apparent from the following detailed description, the accompanying drawings and the claims.

DETAILED DESCRIPTION

Figure 1:
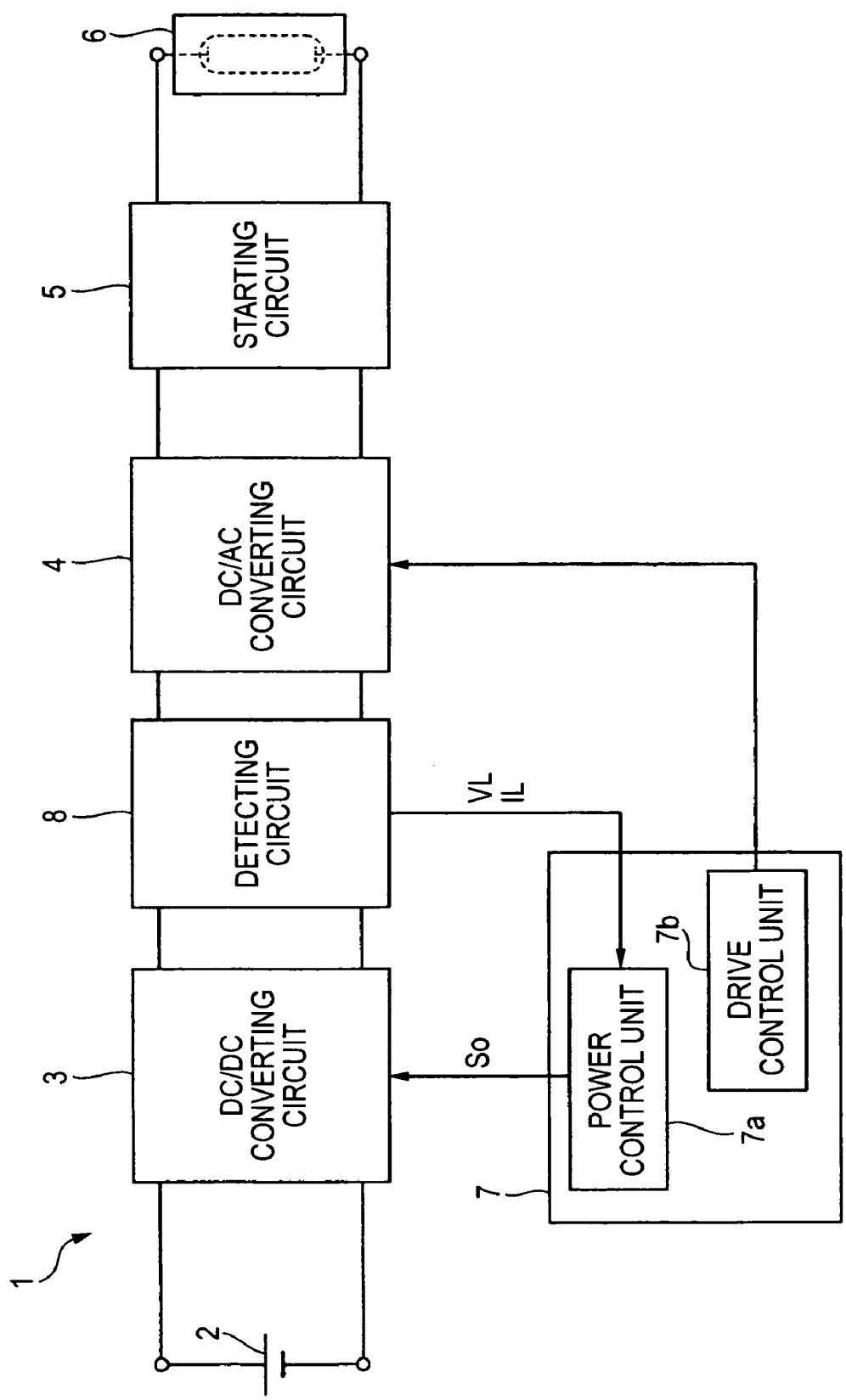
FIG. 1 is a circuit block diagram showing an arrangement of a lighting circuit according to an exemplary embodiment of the present invention.

Referring now to the drawings, exemplary embodiments of the present invention will be described in detail. It should be understood that the same reference numerals will be employed for denoting the same or similar elements in the respective drawings.

FIG. 1 is a circuit block diagram representing an arrangement of a lighting circuit 1 according to an exemplary embodiment of the present invention. The lighting circuit 1 shown in FIG. 1 is used in order to light a discharge tube for a vehicle, in particular, such a mercury-less discharge tube (namely, the discharge tube does not contain mercury, or contains a reduced amount of mercury). The lighting circuit 1 provided with a DC power supply 2, a DC/DC converting circuit 3, a DC/AC converting circuit 4, a starting circuit (so-called "starter") 5, a socket 6, a control circuit 7, and a detecting circuit 8.

The DC/DC converting circuit 3 boots (steps up) an input DC voltage from the DC power supply 2 so as to generate desirable boosted DC power. For example, a flyback type DC/DC converter is employed as the DC/DC converting circuit 3.

The DC/AC converting circuit 4 is provided to convert the boosted DC power from the DC/DC converting circuit 3 into AC power, and then the converted AC power is supplied to the socket 6. For instance, in an H bridge (otherwise, full bridge) type circuit arrangement, two arms are constructed by employing four semiconductor switching elements, and drive circuits are provided in order to separately drive the switching elements of the respective arms. In this H bridge type circuit arrangement, two sets of the switching element pairs are controlled to be turned ON/OFF in an opposite sense in response to signals supplied from a drive control unit 7b which constitutes the control circuit 7 so as to output an AC voltage. It should be noted that the socket 6 has been connected to a discharge tube (not shown in drawings).

The starting circuit 5 is provided in order that a high voltage pulse signal (pulse for starting) with respect to the socket 6 is generated so as to start up the discharge tube connected to the socket 6. In other words, the starting pulse is superimposed on the AC voltage outputted from the DC/AC converting circuit 4, and then the pulse-superimposed AC voltage is applied to the discharge tube.

The control circuit 7 controls electric power which is supplied to a discharge tube in response to a lamp voltage of the discharge tube, a lamp current flowing through this discharge tube, or a detection signal with respect to either a voltage or a current equivalent to the lamp voltage, or lamp current. In other words, a power control unit 7a provided in the control circuit 7 is employed so as to control supplied electric power in response to a state of the discharge tube. For instance, in response to a detection signal (refer to voltage detection signal "VL", or current detection signal "IL") derived from the detecting circuit 8 which detects the boosted DC voltage, or the boosted DC current from the DC/DC converting circuit 3, the power control unit 7a sends a control signal (will be referred to as "$S_o$") with respect to the DC/DC converting circuit 3 in order to control the above-explained boosted DC voltage.

It should also be noted that the power control unit 7a has functions as to a power control operation in a transient time period until the discharge tube reaches a stable lighting state, or as to another power control operation under stationary state of the discharge tube. As a switching control system of the power control unit 7a, for instance, a PWM (pulse-width modulation) system, and a PFM (pulse-frequency modulation) system are known.

Figure 2:
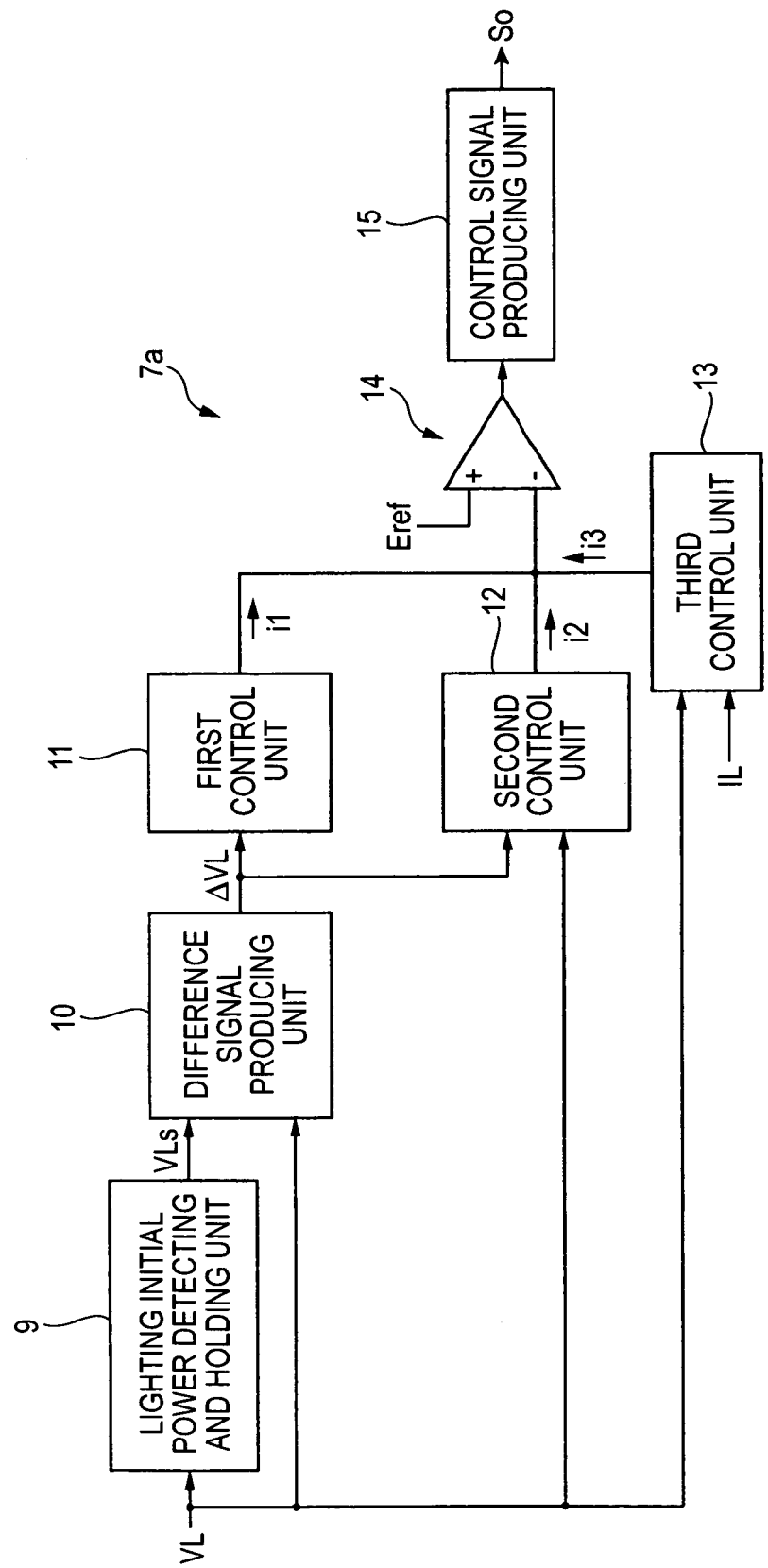
FIG. 2 is a circuit block diagram showing an arrangement of a power control unit.

Next, description is made to the power control unit 7a. FIG. 2 is a circuit block diagram showing an arrangement of the power control unit 7a. The power control unit 7a as indicated in FIG. 2 includes a lighting initial voltage detecting and holding unit 9, a difference signal producing unit 10, a first control unit 11, a second control unit 12, a third control unit 13, an error calculating unit 14, and a control signal producing unit 15.

Both the lighting initial voltage detecting and holding unit 9, and the difference signal producing circuit 10 provided at a post stage thereof detect a change amount of a lamp voltage of the discharge tube, while an initial value of this lamp voltage is defined as a reference. The lighting initial voltage detecting and holding unit 9 detects a lamp voltage immediately after lighting of the discharge tube is started, and also holds the detected lamp voltage as an initial value (will be referred to as "$VL_s$" hereinafter). Then, the lighting initial voltage detecting and holding circuit 9 outputs the initial voltage $VL_s$ to the difference signal producing unit 10.

The difference signal producing unit 10 produces a difference signal indicative of such a difference between the detection signal "VL" of the lamp voltage and the above-explained initial voltage "$VL_s$." Concretely speaking, the difference signal producing unit 10 subtracts the initial value $VL_s$ from the detection signal VL of the lamp voltage so as to calculate a change amount (will be referred to as "$\Delta VL$" hereinafter) of the lamp voltage while the initial value $VL_s$ is defined as a reference, and then supplies this change amount "$\Delta VL$" to the first control unit 11 and the second control unit 12 as a difference signal.

Both the first control unit 11 and the second control unit 12 perform power control operations in conjunction with the third control unit 13, and output currents (refer to "i1", "i2", "i3" shown in FIG. 2) of the respective control units 11 to 13 are supplied to the error calculating unit 14 provided at a post stage thereof. It should also be noted that both the first control unit 11 and the second control 12 are related to a transient power control operation of the discharge tube, whereas the third control unit 13 is related to power control operations other than this transient power control operation.

The first control unit 11 produces such a control signal for the output current i1 in response to the change amount $\Delta VL$ from the difference signal producing unit 10. For instance, the first control unit 11 performs the below-mentioned control operations:

In the case where $\Delta VL \leq Sh1$, the output current i1 is set to a constant current value.

In the case where $Sh1 < \Delta VL < Sh2$, the output current i1 is increased in connection with an increase of the change amount $\Delta VL$.

In the case where $\Delta VL \geq Sh2$, the output current i1 is set to a constant current value. It should also be noted that symbols "Sh1" and "Sh2" indicate preset reference values (threshold values) as to the change amount $\Delta VL$, and a relationship of $Sh1 < Sh2$ is defined.

For instance, while the change amount $\Delta VL$ or the voltage detection signal VL are inputted to the second control unit 12, the second control unit 12 performs a power control operation in such a transient time period until the discharge tube is reached to the stationary lighting state in such a manner that from a time instant when the change amount $\Delta VL$ becomes larger than or equal to the predetermined threshold value, a time change rate of electric power supplied to the discharge tube is switched in response to an increase of the change amount $\Delta VL$, or a time elapse. The output current i2 of the second control unit 12 is increased in accordance with the time elapse with the above time instant as a starting point.

In the case where the time change rate of the supplied power is increased from a minus value to zero due to effects of the second control unit 12, there are two control modes, namely, a control mode for controlling the time change rate in a continuous manner, and another control mode for controlling the time change rate in a stepwise manner. When various aspects of easy control operation and simple circuit arrangement are considered, the latter control mode (namely, stepwise control mode) is preferably conducted. For instance, in such a circuit arrangement that the control unit 12 has a time constant circuit which employs a capacitor and a resistor, at a time instant when a detection is made that the change amount $\Delta VL$ becomes larger than or equal to the predetermined threshold value, the time constant circuit is actuated. Then, the time change amount of the supplied power in the transient time period is changed in the stepwise manner by switching a charging time constant of the capacitor in order for the supplied electric power to converge to the rated electric power (concrete circuit arrangement will be explained later in detail).

Also, the second control unit 12 quickly discharges electric charges of the capacitor when the discharge tube is brought into a light-out state so that the discharge tube does not disturb the above-explained operation under lighting state (both transient power control state and stationary lighting state) and the above-described operation can be repeatedly carried out at re-lighting the discharge tube (for example, hot start) (concrete circuit arrangement will be explained later in detail).

In the third control unit 13, for instance, a control circuit unit for controlling the discharge tube under rated electric power during the stationary lighting operation, and another control unit for controlling electric power in response to a lamp voltage (VL) and a lamp current (IL) are contained so as to define the output current i3 (since structural modes of control circuit units are not directly related to the present invention, detailed explanations thereof are omitted).

A control signal (namely, summation of respective output currents) of the respective control units is sent to the error calculating unit 14. Then, an output signal of the error calculating unit 14 is supplied to the control signal producing unit 15, so that the above-explained control signal "$S_o$" is produced. In this example, while a predetermined reference voltage "Eref" has been applied to one input terminal (positive input terminal) of an error amplifier which constitutes the error calculating unit 14, an error signal obtained by comparing the predetermined reference voltage Eref with a voltage applied to the other input terminal (negative input terminal) is supplied to the control signal producing unit 15.

For instance, in a case where the power control unit 7a is arranged based upon the PWM system, a PWM comparator is contained in the control signal producing unit 15. Such an output signal having a duty ratio changed in response to the error signal derived from the error calculating unit 14 is-produced, and is then supplied to the DC/DC converting circuit 3 (namely, switching elements employed therein). Also, in a case where the power control unit 7a is arranged based upon the PFM system, in the control signal producing unit 15, such an output signal, the frequency of which is changed in response to the error signal derived from the error calculating unit 14 is produced, and is then supplied to the DC/DC converting circuit 3 (namely, switching elements employed therein).

It should also be understood that in this circuit arrangement, the power control operation is carried out in such a manner that the electric power supplied to the discharge tube is reduced in connection with increases of the output currents i1 and i2.

Figure 3:
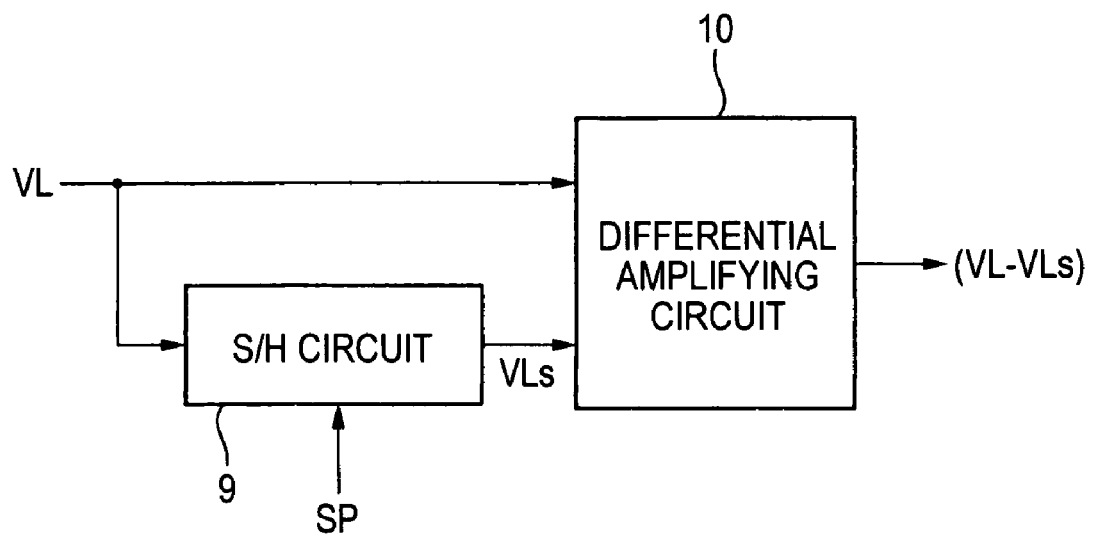
FIG. 3 is a circuit block diagram showing one example of a lighting initial voltage detecting and holding unit, and a difference signal producing unit.

Next, description is made of both the lighting initial voltage detecting and holding circuit 9, and the difference signal producing unit 10. FIG. 3 is a circuit block diagram representing one example of the lighting initial voltage detecting and holding circuit 9, and the difference signal producing unit 10. As indicated in FIG. 3, each of the lighting initial voltage detecting and holding circuit 9, and the difference signal producing unit 10 can be arranged by a sample/hold (S/H) circuit and a differential amplifying circuit, and detects a change amount of the voltage detection signal VL from the initial value $VL_s$.

Upon receipt of a predetermined timing signal (corresponding to a sampling pulse, and hereinafter referred to as "SP"), the sample/hold circuit 9 holds the voltage detection signal VL, so that the initial value $VL_s$ is outputted. For example, this sample/hold circuit 9 uses such a circuit arrangement arranged by employing a switching element which is turned ON and OFF by receiving the sampling pulse SP, a holding capacitor, and a voltage buffer. In a time period after lighting of the discharge tube is started until a predetermined time elapses, the switching element is brought into an ON state by receiving the sampling pulse SP, so that a lamp voltage is applied to the holding capacitor. At a time instant when the predetermined time has passed, the sampling pulse SP is changed, so that when the switching element is brought into an OFF state, the lamp voltage ($VL_s$) is held.

The differential amplifying circuit 10 corresponds to such a circuit for obtaining an output which is directly proportional to a subtraction result ($VL - VL_s$), namely the circuit for calculating the change amount $\Delta VL$ of the lamp voltage. This differential amplifying circuit 10 may employ, for instance, a known circuit with employment of an operational amplifier.

It should also be noted that although the sample/hold circuit 9 is used for holding the lamp voltage $VL_s$ in this example, the present invention is not limited thereto, for instance, a bottom holding circuit for the voltage detection signal VL may be employed. Since the VL value represents a minimum value just after the discharge tube is lighted, this minimum value is detected to be held, so that the lamp voltage "$VL_s$" may be obtained.

Next, the second control unit 12 is explained. For example, as explained above, in case where the second control unit 12 includes the time constant circuit containing the capacitor and resistor, the below-mentioned modes as to the second control unit 12 may be conceived:

(I) A mode in which while a terminal voltage of the capacitor is compared with a predetermined reference value in connection with an increase of this terminal voltage, the time change rate of the electric power applied to the discharge tube is switched.

(II) Another mode in which while a change amount $\Delta VL$ of a lamp voltage is compared with a predetermined reference value in connection with an increase of this change amount $\Delta VL$, the time change rate of the electric power applied to the discharge tube is switched.

In the above-described mode (I), a time duration from a start of a charging operation of a timer controlling capacitor to the switch of the time constant can be made constant. Therefore, the applied electric power can be properly suppressed within a time period during which noise may be readily generated (namely, noise may be suppressed to a minimum amount). Also, in the above-explained mode (II), lamp states may be reflected to the switching control operation of the time constant, so that an overshoot amount may be reduced to as small as possible when luminous flux rises.

Figure 4:
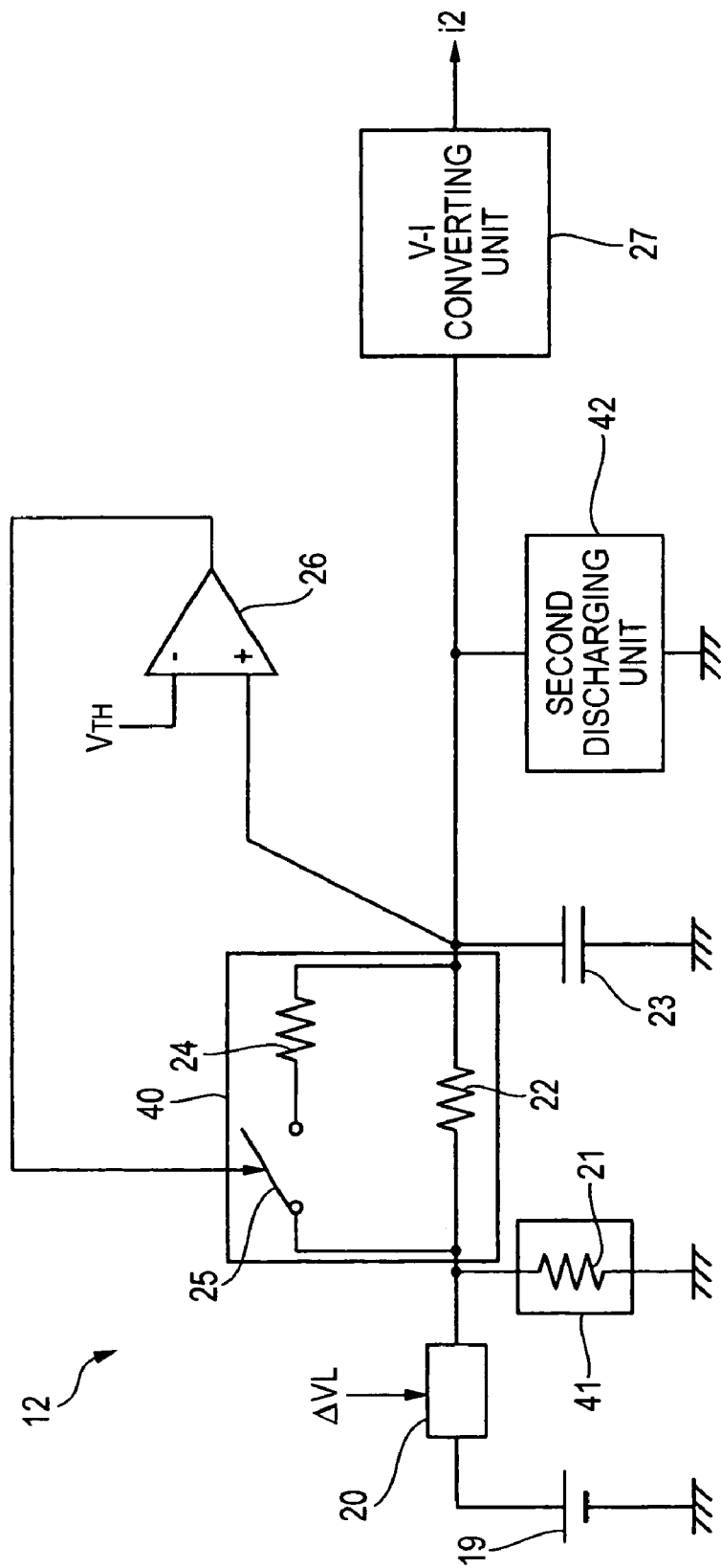
FIG. 4 is a circuit block diagram representing an arrangement of a second control unit.

In the below-mentioned explanation, as the second control unit 12, such a mode for switching two types of time constants is exemplified in the above-described mode (I). FIG. 4 is a circuit block diagram showing an arrangement of the second control unit 12. The second control unit 12 shown in FIG. 4 includes a charging unit 20, a resistive circuit 40, a capacitive element (will be referred to as "capacitor" hereinafter) 23, a first discharging unit 41, a second discharging unit 42, a comparing circuit 26, and a V-I converting unit 27.

The charging unit 20 produces a charging-purpose * electric charge from a voltage received from a power supply 19 (indicated by symbol of constant voltage source) based upon a difference signal $\Delta VL$. The charging unit 20 does not output the electric charge for a time period until this difference signal $\Delta VL$ reaches a predetermined threshold value (this threshold value is referred to as "$\Delta VL2$"), but outputs the electric charge when $\Delta VL2 \geqq \Delta VL2$. A detailed explanation as to the charging unit 20 will be explained later. An output terminal of the charging unit 20 is connected via the resistive circuit 40 to both one terminal of the capacitor 23 and the first discharging unit 41.

While the first discharging unit 41 contains a resistor 21, one terminal of the resistor 21 is connected via the resistive circuit 40 to one terminal of the capacitor 23. The other terminal of the resistor 21 is connected to ground.

The resistive circuit 40 is arranged by a resistor 22, a resistor 24, and a switching element 25 (this switching element is simply indicated by symbol of switch). The switching element 25 is connected to the resistor 24 which is connected parallel to the resistor 22. The other terminal of the resistor 24 is connected via the switching element 25 to a connection point between the resistor 21 and the resistor 22.

One terminal of the capacitor 23 is connected to the comparing circuit 26, an input terminal of the V-I converting unit 27, and the second discharging unit 42 respectively, whereas the other terminal of the capacitor 23 is connected to ground.

A terminal voltage (will be indicated as "Vc") of the capacitor 23 is compared with a predetermined reference voltage (will be indicated as "VTH") in the comparing circuit 26. Then, a binary signal outputted in response to a comparison result is supplied to a switching element 25 as a control signal. In other words, an ON/OFF control operation of this switching element 25 is carried out in such a manner that when Vc<VTH, the switching element 25 is brought into an OFF state, whereas when Vc>VTH, the switching element 25 is brought into an ON state.

The V-I converting unit 27 converts this input voltage value Vc into a current value which is directly proportional to the input voltage value, so that such an output current (above-explained i2) in response to the input voltage Vc is obtained from the V-I converting unit 27.

As previously explained, in this example, in the time constant circuit having one capacitor 23 and plurality of resistors, at the time instant when it is so detected that the change amount $\Delta$VL of the lamp voltage equals the predetermined threshold value $\Delta$VL2, the charging operation of the capacitor 23 is started by the charging unit 20, the terminal voltage Vc of the capacitor 23 is increased in accordance with a first time constant (will be expressed as "$\tau$1") made by the capacitance value of this capacitor 23 and the resistance value of the resistor 22, and the electric power supplied to the discharge tube is controlled (is reduced) in the transient time period in such a relationship opposite to the change of the terminal voltage Vc. Thereafter, the terminal voltage Vc is further increased, and then, at a time instant when Vc>VTH, the switching element 25 is brought into the ON state. As a result, the number of charging paths to the capacitor 23 is increased to two charging paths, so that the time constant is switched to a second time constant (will be expressed as "$\tau$2") which is smaller than the first time constant $\tau$1. As a consequence, the increasing ratio of the terminal voltage Vc is increased, so that the lower speed (namely, absolute value of time change rate) of the supplied electric power in the transient time period is increased.

The second discharging circuit 42 does not disturb the above-explained charging operation of the capacitor 23 by the resistive circuit 40 and the comparing circuit 26. The second discharging unit 42 quickly discharges the electric charge of the capacitor 23 when the discharge tube is brought into a "light-out" state.

It should also be noted that when $\Delta$VL<$\Delta$VL2, a discharging path of the capacitor 23 is formed via the first discharging unit 41, whereas when the discharge tube is brought into the "light-out" state, another discharging path is formed by both the first discharging unit 41 and the second discharging unit 42. A detailed explanation of the second discharging unit 42 will be explained later.

Figure 5:
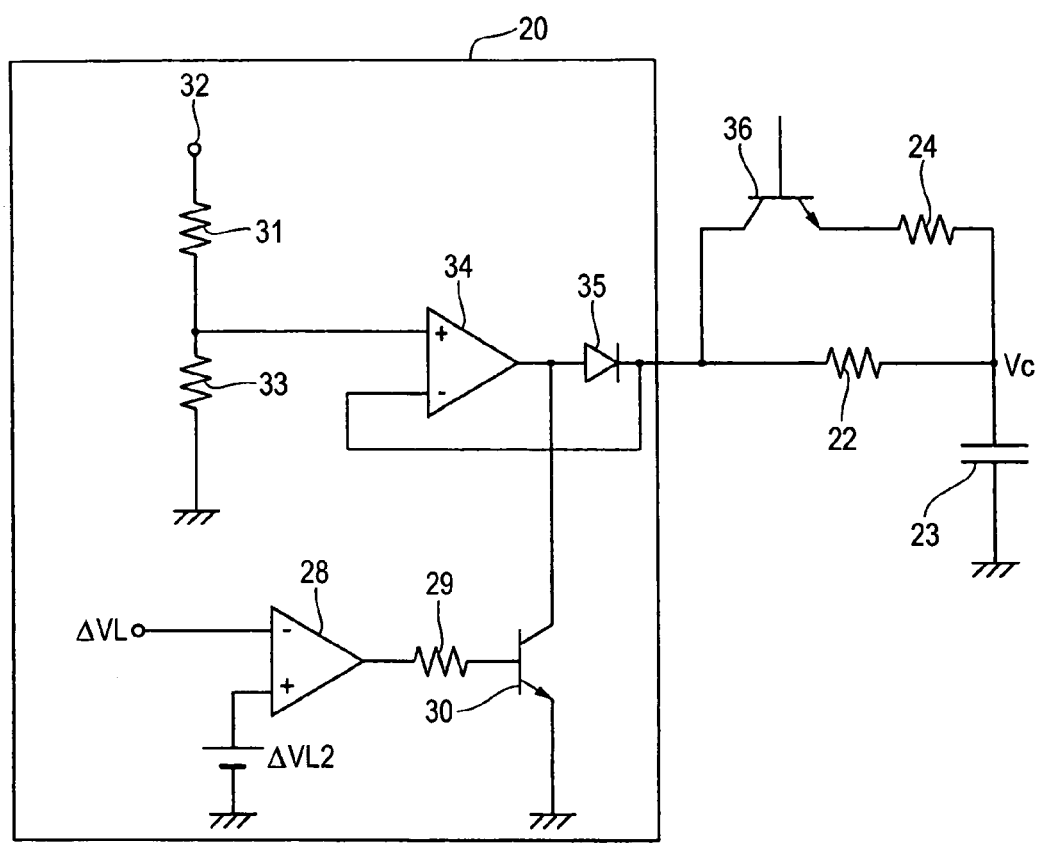
FIG. 5 is a circuit block diagram showing an arrangement of a charging unit in connection with a major unit of the second control unit.

Next, description is made of the charging unit 20. FIG. 5 is a circuit block diagram showing an arrangement of the charging unit 20 in combination with the major unit of the second control unit 12. The discharging unit 20 shown in FIG. 5 is provided with a comparator 28, a resistor 29, an NPN transistor 30, resistors 31 and 33, an operational amplifier 34, and a diode 35.

In the comparators 28, the change amount $\Delta$VL is entered to a negative input terminal thereof, and a reference voltage equivalent to the predetermined threshold value $\Delta$VL2 is applied to a positive input terminal thereof. Then, an output signal of the comparator 28 is supplied via the resistor 29 to a base of the NPN transistor 30 whose emitter is connected to ground.

One terminal of the resistor 31 is connected to a power supply terminal 32 of a predetermined voltage, and the other terminal of this resistor 31 is connected via the resistor 33 to the ground. Since the voltage applied to the power supply terminal 32 is divided by the resistor 31 and the resistor 33 in the above-described manner, such a voltage indicated as the power supply 19 in FIG. 4 is produced.

A non-inverting input terminal of the operational amplifier 34 is connected to a connection point between the resistors 31 and 33, and an inverting input terminal thereof is connected to the diode 35 at a post stage of the operational amplifier 34. In other words, an output terminal of the operational amplifier 34 is connected to an anode of the diode 35, and a cathode of this diode 35 is connected to the inverting input terminal of the operational amplifier 34, the resistor 22, and the NPN transistor 36.

Then, a collector of the transistor 30 is connected to the output terminal of the operational amplifier 34. When the change amount $\Delta$VL is smaller than the threshold value $\Delta$VL2, the transistor 30 is brought into an ON state by receiving the output signal of the comparator 28. The output terminal of the operational amplifier 34 is substantially grounded so that the charging operation of the capacitor 23 is not carried out. When the change amount $\Delta$VL is larger than or equal to the threshold value $\Delta$VL2, the transistor 30 is brought into an OFF state by receiving the output signal of the comparator 28, the operational amplifier 34 functions as a buffer circuit, and the voltage divided by the resistors 31 and 33 is applied via the resistor 22 to the capacitor 23 (since charging operation is started, Vc value is increased with time constant $\tau$1).

In this example, the NPN transistor 36 connected to the resistor 24 corresponds to the above-explained switching element 25, and a control signal produced based upon the comparison result between Vc and VTH is applied a base of the transistor 36.

Figure 6:
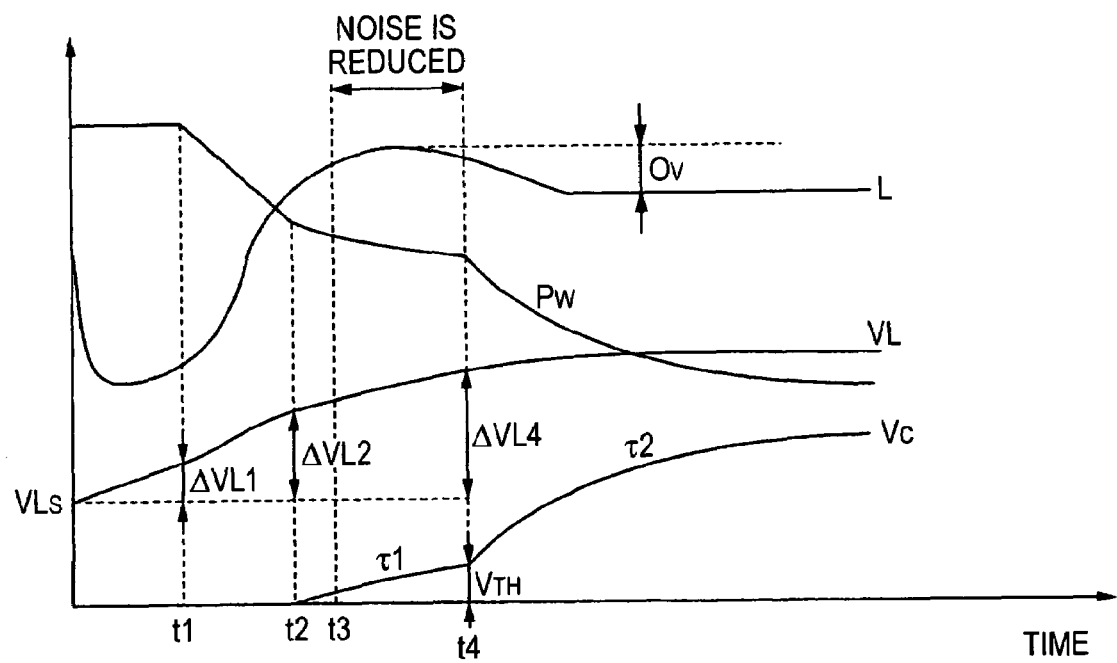
FIG. 6 is a diagram showing waveforms of respective circuit portions when a discharge tube is lighted by the lighting circuit of this exemplary embodiment.

FIG. 6 is a graphic representation showing temporal changes as to an optical output "L", supplied electric power Pw, the lamp voltage VL, and the terminal voltage Vc of the capacitor 23 (the defined time instants t1, t2, t4, and so on have already been explained previously).

At the time instant t2 when the change amount $\Delta$VL reaches the previous threshold value $\Delta$VL2, the charging operation to the capacitor 23 is started. At this time, the charging time constant ($\tau$1) is set to a large value. As a result, the reducing speed related to the electric power to the discharge tube is suppressed, so that a larger amount of electric power can be supplied to the discharge tube (time period from t3 to t4). That is, in this time period, if the larger amount of electric power is applied to the discharge tube, the lamp operation can pass through the unstable condition without stopping, under which radio noise may be easily generated, and thus the lamp operation can quickly recover from this unstable condition (namely, noise suppression effect can be sufficiently achieved).

Thereafter, at the time instant t4, Vc>VTH, so that the charging time constant is switched to $\tau$2. In other words, since the charging operation to the capacitor 23 is quickened, the supplied electric power can be largely reduced so as to be converged to the supplied power value under stationary control operation.

As a result, regarding the rising characteristic of the optical output, the overshoot amount "Ov" can be sufficiently suppressed, and furthermore the radiation noise generated from the discharge tube can be sufficiently lowered in the time period from t3 to t4.

First Exemplary Embodiment

Figure 7:
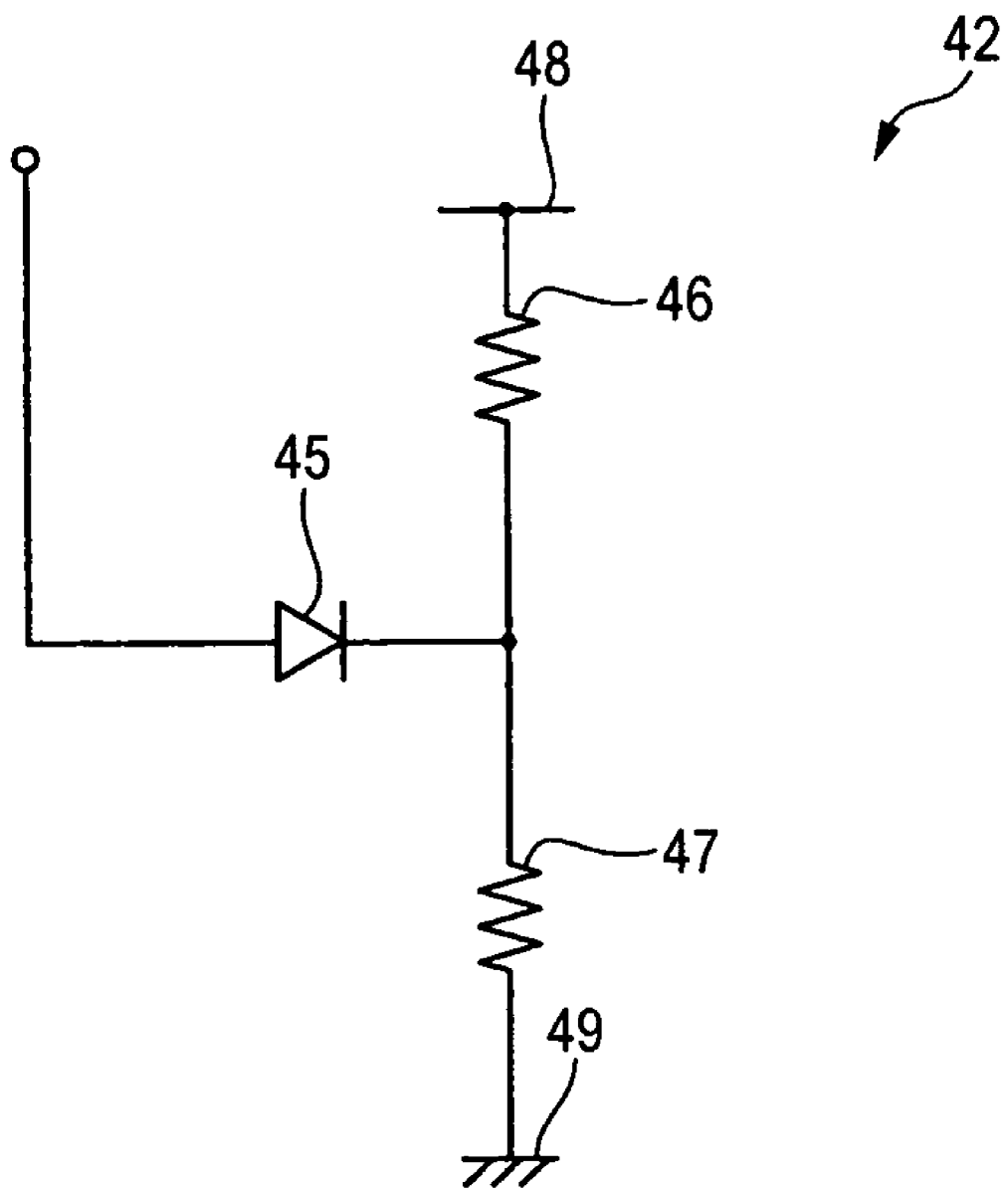
FIG. 7 is a circuit diagram showing an arrangement of a second discharging unit according to a first exemplary embodiment of the present invention.

Next, description is made of the second discharging unit 42 according to a first exemplary embodiment of the present invention. FIG. 7 is a circuit diagram showing an arrangement of the second discharging unit 42 according to the first exemplary embodiment of the present invention. The discharging unit 42 shown in FIG. 7 includes a diode 45 and resistor elements 46 and 47.

An anode of the diode 45 is connected to the capacitor 23, and a cathode of the diode 45 is connected to one terminal of the resistor element 46 and one terminal of the resistor element 47. The other terminal of the resistor element 46 is connected to a first power supply line 48, and the other terminal of the resistor element 47 is connected to a second power supply line (for example, ground line) 49.

A voltage is generated on the first power supply line in connection with a lamp voltage applied to the discharge tube. Concretely speaking, when an input DC voltage is turned ON, such a voltage which can satisfy the below-mentioned formula (1) is generated on the first power supply line 48, whereas when the input DC voltage is turned OFF, the first power supply line 48 is grounded.

$$Vc < Vb - Vf \quad (1)$$

In this formula (1), symbol "Vc" indicates a voltage at the anode of the diode 45, namely a terminal voltage of the capacitor 23, and symbol "Vb" represents a voltage at the cathode of the diode 45.

In other words, the diode 45 is brought to the OFF state when the input. DC voltage is turned ON and the diode 45 is brought to the ON state when the input DC voltage is turned OFF, so that the second discharging unit 42 provides two discharging paths for the capacitor 23 in response to turning-OFF the input DC voltage. These two discharging paths correspond to a discharging path arranged by the diode 45 and the resistor element 46, and another discharging path arranged by the diode 45 and the resistor element 47. It should be understood that the resistance values of the resistor elements 46 and 47 are preferably selected to be smaller than the resistance value of the resistor 21 in the first discharging unit 41 in order to quickly discharge the capacitor 23.

Figure 8:
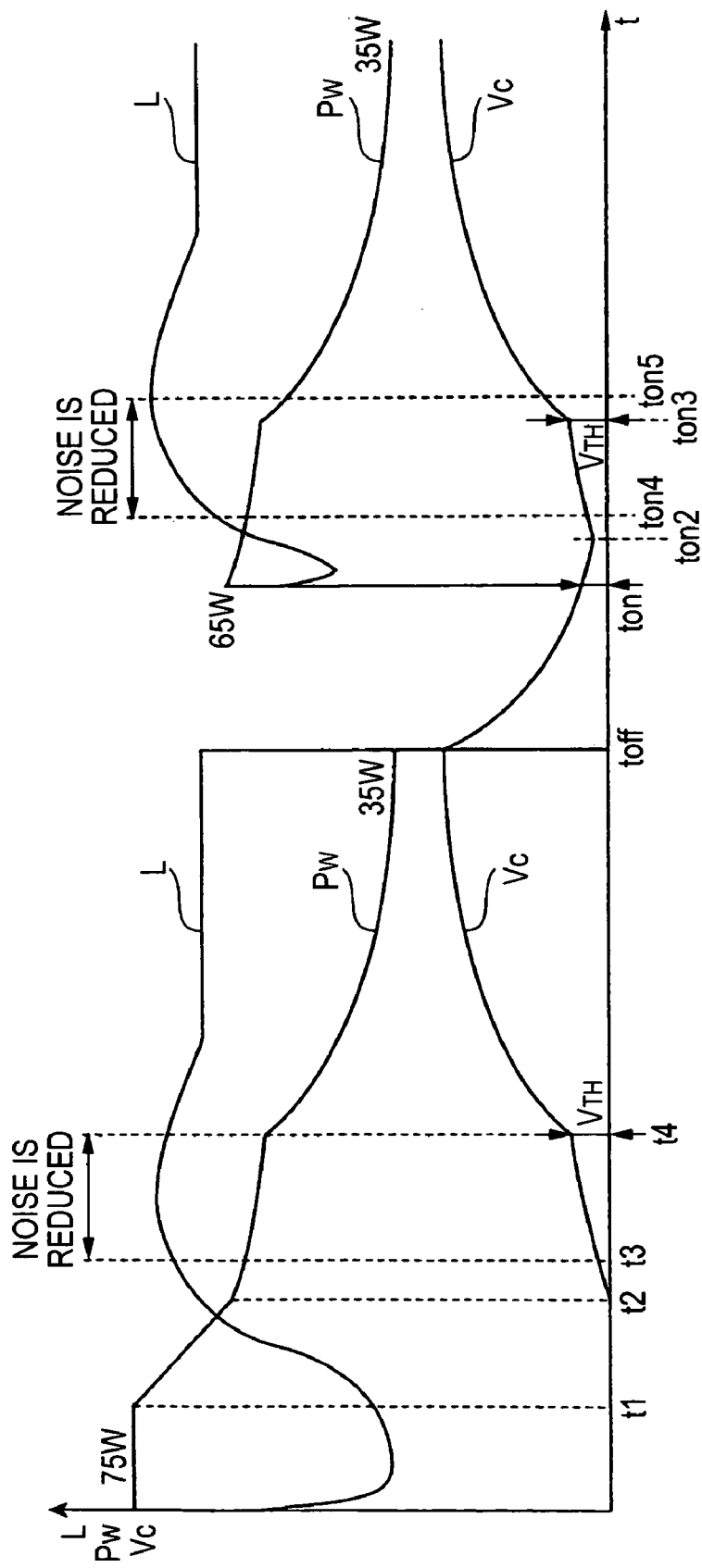
FIG. 8 is a diagram showing waveforms of respective circuit portions when a discharge tube is re-lighted by the lighting circuit of this exemplary embodiment.
Figure 9:
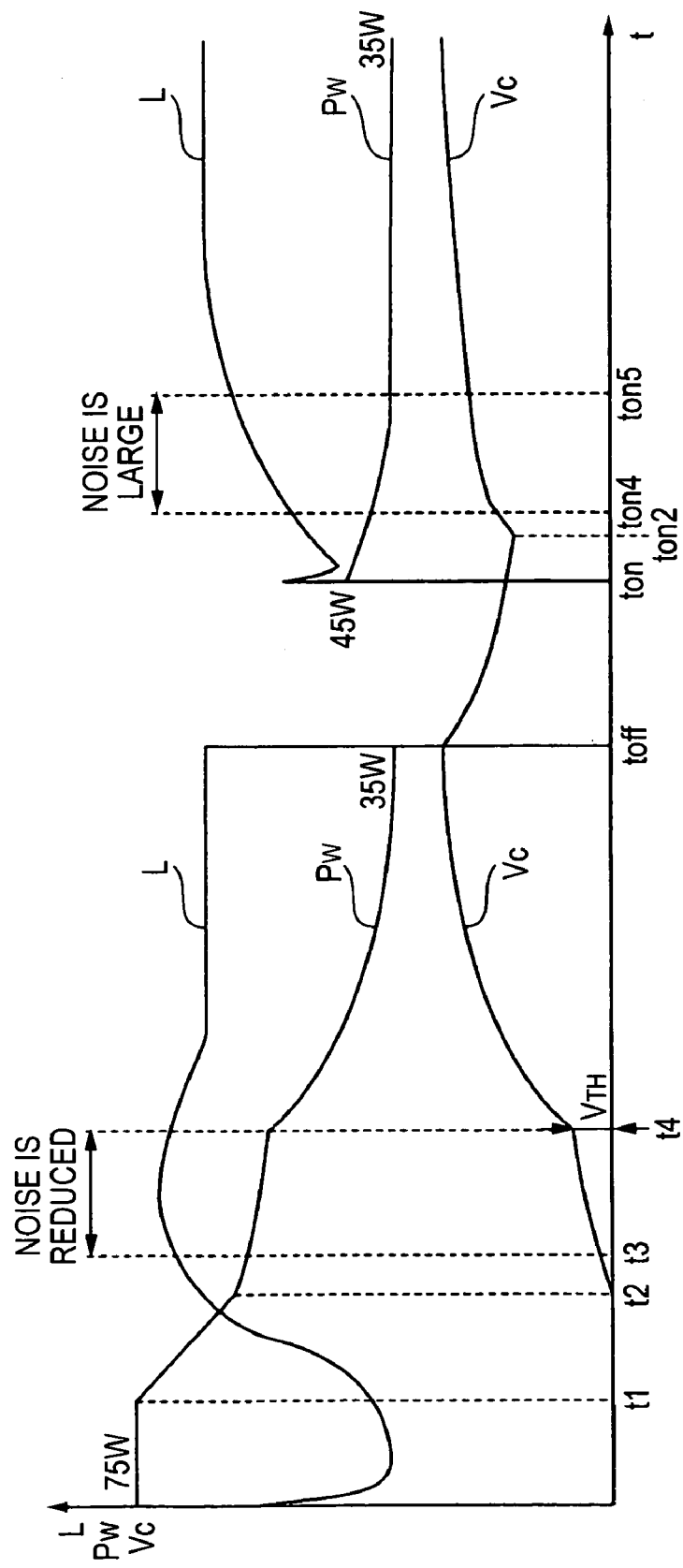
FIG. 9 is a diagram showing waveforms of respective circuit portions when the discharge tube is re-lighted by a lighting circuit which is not equipped with the second discharging unit of this exemplary embodiment.

Next, description is made of operations when the discharge tube is re-lighted (for example, hot restart) with reference to FIG. 8 and FIG. 9. FIG. 8 is a diagram showing waveforms of the respective circuit portions when the discharge tube is re-lighted by the lighting circuit of the first exemplary embodiment. FIG. 9 is a diagram showing waveforms of the respective circuit portions when the discharge tube is re-lighted by a lighting circuit which is not equipped with the second discharging unit 42 of the first exemplary embodiment. FIG. 8 and FIG. 9 are-graphic representations showing temporal changes as to an optical output L, supplied electric power Pw, the lamp voltage VL, and the terminal voltage Vc of the capacitor 23.

Referring firstly to FIG. 9, a description is made of operations when the discharge tube is re-lighted by a lighting circuit which is not equipped with the second discharging unit 42 of the first exemplary embodiment. At a time "toff", when the input DC voltage is turned OFF, the supplied electric power Pw becomes zero, so that the discharge tube is brought into the light-out state. In other words, the optical output L becomes zero. However, the electric charge of the capacitor 23 is discharged by the resistor 21 employed in the first discharging unit 41 via the resistor 22 which is employed in order to determine the charging time constant τ1 in the resistive circuit 40. As a result, the terminal voltage Vc of the capacitor 23 is gently lowered.

Thereafter, for example, at a time "ton" namely, when 20 seconds have passed from the time "toff", and the input DC voltage is then turned ON (hot restart), since the terminal voltage Vc of the capacitor 23 is high, the boosted DC power outputted from the DC/DC converting circuit 3 is limited by the V-I converting unit 27, the error calculating unit 14, and the control signal producing unit 15, and, the supplied electric power Pw is limited. As a consequence, the large supplied electric power Pw cannot be produced in a time period (ton4-ton5) during which the transient power control operation is performed, so that radiation noise is emitted (as one example of experimental results, Pw is nearly equal to 45 W at maximum, "ton4" and "ton5" are approximately 5 seconds and approximately 15 seconds respectively after ton has elapsed, thus radiation noise was produced for about 10 seconds). Also, a time "ton2" corresponds to such a timing when the discharging unit 20 starts the discharging operation to the capacitor 23, and set to, for example, ΔVL2=about 3V, or VL≧about 35 V.

Next, referring now to FIG. 8, description is made of operations when the discharge tube is re-lighted by the lighting circuit of the first exemplary embodiment. At a time toff, when the input DC voltage is turned OFF, the supplied electric power Pw becomes zero, so that the discharge tube is brought into the light-out state. In other words, the optical output L becomes zero. At this time, since the first power supply line 48 in the second discharging unit 42 is grounded and the diode 45 is brought into the ON state, the electric charge of the capacitor 23 is discharged via the resistive circuit 40 by the first discharging unit 41, and also is quickly discharged by the discharging path which is constructed by the diode 45 and the resistor elements 46 and 47 employed in the second discharging unit 42. When the terminal voltage Vc of the capacitor 23 equals Vf of the diode 45, this diode 45 is brought into the OFF state. However, the electric charge of the capacitor 23 is continuously discharged via the resistive circuit 40 by the first discharging unit 41. As previously explained, the terminal voltage Vc of the capacitor 23 is quickly lowered lower than Vf of the diode 45.

Thereafter, for example, at a time ton namely, when 20 seconds have passed from the time toff and the input DC voltage is turned ON (hot restart), since the terminal voltage Vc of the capacitor 23 is low, the boosted DC power outputted from the DC/DC converting circuit 3 is high due to the V-I converting unit 27, the error calculating unit 14, and the control signal producing unit 15, and the supplied electric power Pw is high. As a consequence, the sufficiently high electric power Pw can be produced in a time period (ton4-ton5), so that radiation noise is reduced (as one example of experimental results, Pw is nearly equal to 65 W at maximum, ton4 and ton5 are approximately 5 seconds and approximately 15 seconds respectively after ton has elapsed, and thus radiation noise could be reduced, as compared with the conventional circuit shown in FIG. 9 for about 10 seconds)

Also, the quick discharging operation by the second discharging unit 42 is limited by the diode 45 until the terminal voltage Vc of the capacitor becomes Vf, and thereafter, the electric charge of the capacitor 23 is gently discharged via the resistive circuit 40 by the first discharging unit 41. As a consequence, there is no possibility that the terminal voltage Vc of the capacitor 23 is not lowered to zero before the discharge tube is brought into a cooled state. Accordingly, the overshoot may also be suppressed in the rising characteristic of the optical output L.

As previously explained, in accordance with the lighting circuit of the first exemplary embodiment, even when the discharge tube is re-lighted, the radiation noise can be suppressed without deteriorating the rising characteristic of the optical output of the discharge tube.

Second Embodiment

Figure 10:
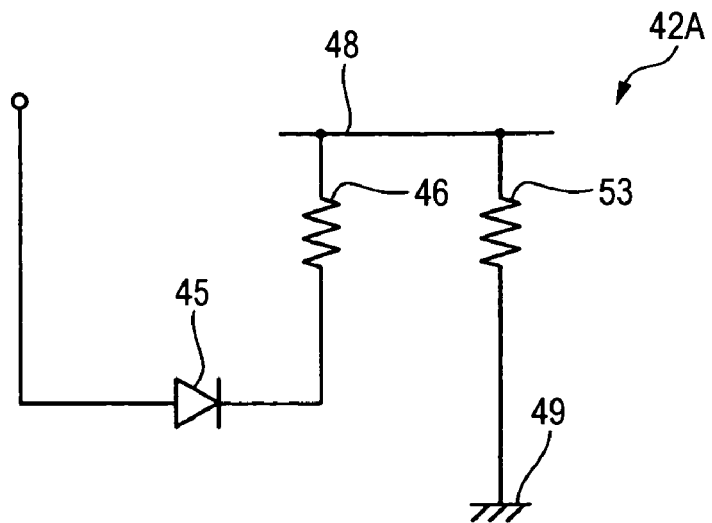
FIG. 10 is a circuit diagram showing an arrangement of a second discharging unit according to a second exemplary embodiment of the present invention.

Next, a description is made of a second discharging unit 42A according to a second exemplary embodiment of the present invention. FIG. 10 is a circuit diagram showing an arrangement of the second discharging unit 42A according to the second exemplary embodiment of the present invention. The second discharging unit 42A shown in FIG. 10 can be employed instead of the second discharging unit 42 of the first exemplary embodiment. The second discharging unit 42A is different from the second discharging unit 42 as to the arrangement which is not provided with the resistance element 47 in the second discharging unit 42.

The second discharging unit 42A provides one discharging path (namely, discharging path constituted by diode 45 and resistor element 46) for the capacitor 23 in response to such a condition that the input DC voltage is turned OFF. Also, in the lighting circuit of this second exemplary embodiment, a similar merit to the lighting circuit of the first exemplary embodiment can be achieved. In this case, since a resistor 53 having a resistance value smaller than the resistance value of the resistor element 46 is furthermore connected between the first power supply line 48 and the second power supply line 49, a potential at the first power supply line 48 can be made equal to a potential at the second power supply line 49 when the input DC voltage is turned OFF, and thus the discharging operation of the second discharging unit 42 can be carried out in high precision.

Third Exemplary Embodiment

Figure 11:
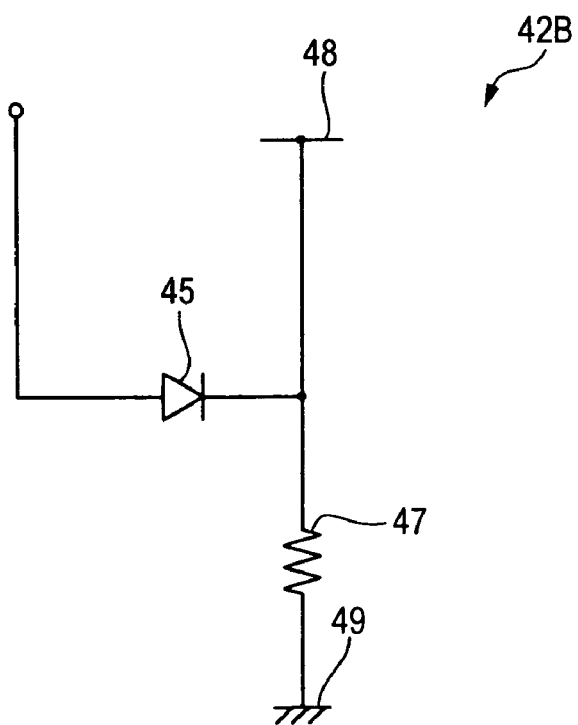
FIG. 11 is a circuit diagram showing an arrangement of a second discharging unit according to a third exemplary embodiment of the present invention.

Next, description is made of a second discharging unit 42B according to a third exemplary embodiment of the present invention. FIG. 11 is a circuit diagram showing an arrangement of the second discharging unit 42B according to the third exemplary embodiment of the present invention. The second discharging unit 42B shown in FIG. 11 can be employed instead of the second discharging unit 42 of the first exemplary embodiment. The second discharging unit 42B is different from the second discharging unit 42 as to the arrangement which is not provided with the resistance element 46 in the second discharging unit 42, and is different from the second discharging unit 42 as to the arrangement in which the cathode of the diode 45 and one terminal of the resistor element 47 are connected to the first power line 48.

In the first exemplary embodiment, when the input DC voltage is turned OFF, the first power supply line 48 is grounded. In this third exemplary embodiment, when the input DC voltage is turned OFF, the first power supply line 48 is brought into an open state. As previously explained when the input DC voltage is turned ON, the diode 45 can be brought into the OFF state, whereas when the input DC voltage is turned OFF, the diode 45 can be brought into the ON state. The second discharging unit 42B provides one discharging path (namely, discharging path constituted by diode 45 and resistor element 47) for the capacitor 23 in response to such a condition that the input DC voltage is turned OFF. Also, in the lighting circuit of the third exemplary embodiment, a similar merit to the lighting circuit of the first exemplary embodiment can be achieved.

Fourth Exemplary Embodiment

Figure 12:
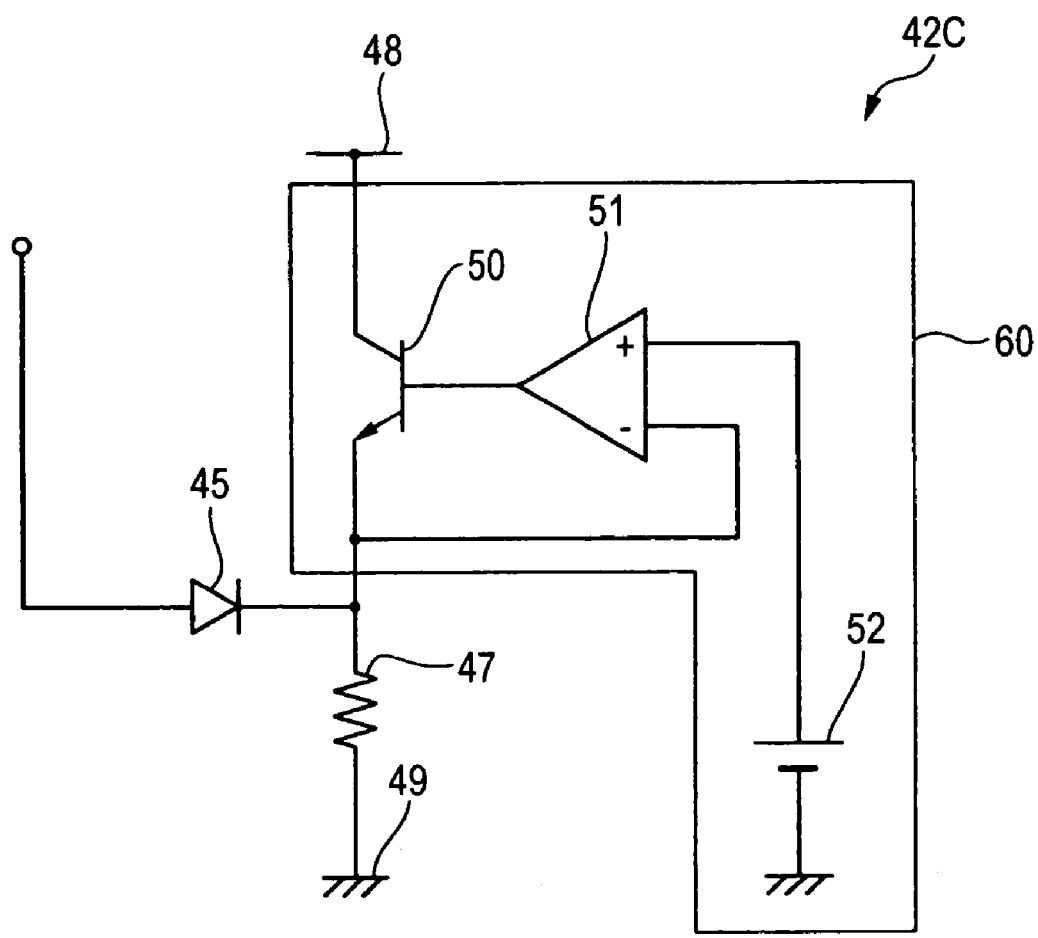
FIG. 12 is a circuit diagram showing an arrangement of a second discharging unit according to a fourth exemplary embodiment of the present invention.
Figure 13:
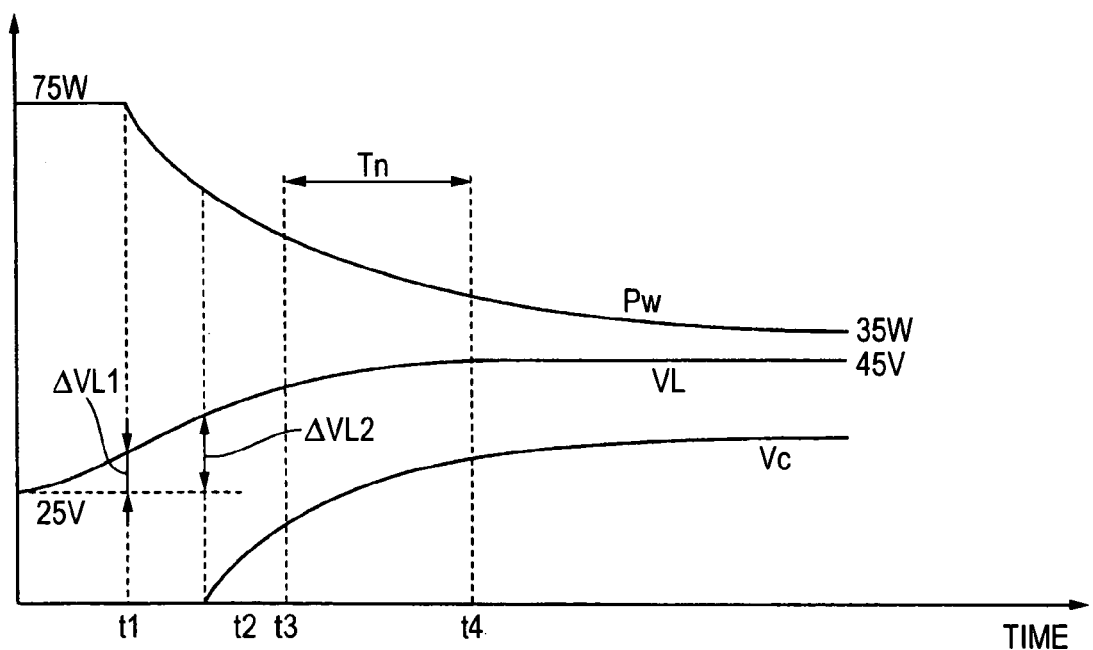
FIG. 13 is a diagram representing the waveforms of the respective circuit portions when the discharge tube is lighted by the conventional lighting circuit.

Next, description is made of a second discharging unit 42C according to a fourth exemplary embodiment of the present invention. FIG. 12 is a circuit diagram showing an arrangement of the second discharging unit 42C according to the fourth exemplary embodiment of the present invention. The second discharging unit 42C shown in FIG. 12 can be employed instead of the second discharging unit 42 of the first exemplary embodiment. The second discharging unit 42C is different from the second discharging unit 42 as to the arrangement which is provided with an interrupting circuit 60 instead of the resistance element 46 in the second discharging unit 42.

The interrupting circuit 60 may be, for example, an emitter follower, and constituted by an NPN transistor 50 and an amplifier 51. A collector of the NPN transistor 50 is connected to the first power line 48, and an emitter of the NPN transistor 50 is connected to a cathode of the diode 45 and one terminal of the resistor element 47. A base of the NPN transistor 50 is connected to an output terminal of the amplifier 51. While a reference voltage is applied from a reference power supply 52 to a first input terminal of the amplifier, a first input terminal of the amplifier 51 is connected to the emitter of the transistor 50.

Also, in this fourth exemplary embodiment, when the input DC voltage is turned ON, both the voltage of the first power supply line 48 and the reference voltage are set in order that the voltage Vb can satisfy the above-described formula (1). However, when the input DC voltage is turned OFF, the operation of the emitter follower which employs the input DC voltage as the power supply is stopped. As a result, since a current does not flow from the capacitor 23 to the first power supply line 48 by the transistor 50, both the first power supply line 48 and the reference voltage need not be changed.

In other words, when the input DC voltage is turned ON, the diode 45 can be brought into the OFF state, whereas when the input DC voltage is turned OFF, the diode 45 can be brought into the ON state. As a result, the second discharging unit 42C provides one discharging path (namely, discharging path constituted by diode 45 and resistor element 47) for the capacitor 23 in response to such a condition that the input DC voltage is turned OFF. Also, in the lighting circuit of this fourth exemplary embodiment, a similar merit to the lighting circuit of the first exemplary embodiment can be achieved.

It should be understood that the present invention is not limited only to the above exemplary embodiments, but may be modified in various manners.

In an exemplary embodiment, when the input DC voltage is turned OFF, the second discharging unit 42 provides two discharging paths for the capacitor 23, whereas the second discharging units 42A, 42B, and 42C provide one discharging path for the capacitor element 23, respectively. Alternatively, the second discharging units 42, 42A, 42B, 42C may further provide a plurality of discharging paths. As the plurality of discharging paths, for instance, such a structure may be conceived in which two diodes are connected in series to each other, and a discharging circuit is further employed in which the voltage Vf of the above-explained formula (1) is selected to be 2 Vf which is approximately two times higher than the voltage Vf. Also, such a resistor element having a smaller resistance value than the resistance values of the resistor elements 46 and 47 may be alternatively connected between the capacitor 23 and the anode of the diode 45 in order to stabilize the input signal to the V-I converting unit 27.

Also, in these exemplary embodiments, the second discharging units 42, 42A, 42B, 42C have been equipped with the diode 45 in order that when the input DC voltage is turned ON, the discharging path for the capacitor 23 is not provided, whereas when the input DC voltage is turned OFF, the discharging path for the capacitor 23 is provided. Alternatively, a transistor may be employed instead of the diode 45 so as to realize these second discharging units 42, 42A, 42B, and 42C.

What is claimed is:

1. A lighting circuit which lights a vehicle discharge tube, the lighting circuit comprising:

a DC/DC converting circuit which boosts an input DC voltage so as to produce boosted DC power;

a detecting circuit coupled to said DC/DC converting circuit, which produces a detection signal in response to an output voltage of said DC/DC converting circuit;

a DC/AC converting circuit which receives said boosted DC power and produces AC power to be supplied to said discharge tube;

a starting circuit coupled to said DC/AC converting circuit, which starts up said discharge tube; and a control circuit coupled to said DC/DC converting circuit, which receives said detection signal from said detecting circuit, wherein said control circuit includes:

a difference signal producing unit which produces a difference signal indicative of a difference between said detection signal and an initial value of said detection signal;

a charging unit which receives said difference signal and supplies an electric charge in a case where said difference is greater than or equal to a predetermined threshold value;

a capacitance element coupled to an output of said charging unit via a resistive circuit;

a first discharging unit which is coupled to the output of said charging unit and to said capacitance element via said resistive circuit;

a second discharging unit coupled to said capacitance element, which provides a discharging path for said capacitance element in response to a turning-OFF of said input DC voltage; and a signal producing unit which produces a control signal used to adjust the output of said DC/DC converting circuit in response to a terminal voltage of said capacitance element.

2. A lighting circuit as claimed in claim 1, wherein said second discharging unit includes:

a diode having an anode coupled to said capacitance element;

a first resistor element coupled between a cathode of said diode and a first power supply line; and a second resistor element coupled between the cathode of said diode and a second power supply line.

3. A lighting circuit as claimed in claim 1, wherein said second discharging unit includes:

a diode having an anode coupled to said capacitance element; and a resistor element coupled between a cathode of said diode and a power supply line.

4. A lighting circuit as claimed in claim 1, wherein said second discharging unit includes:

a diode having an anode coupled to said capacitance element and a cathode coupled to a first power supply line; and a resistor element coupled between the cathode of said diode and a second power supply line.

5. A lighting circuit as claimed in claim 4, further comprising:

an interrupting circuit interposed between said first power supply line and the cathode of said diode, which interrupts a connection between said first power supply line and the cathode of said diode when said input DC voltage is turned OFF.

* * * * *